United States Patent Office

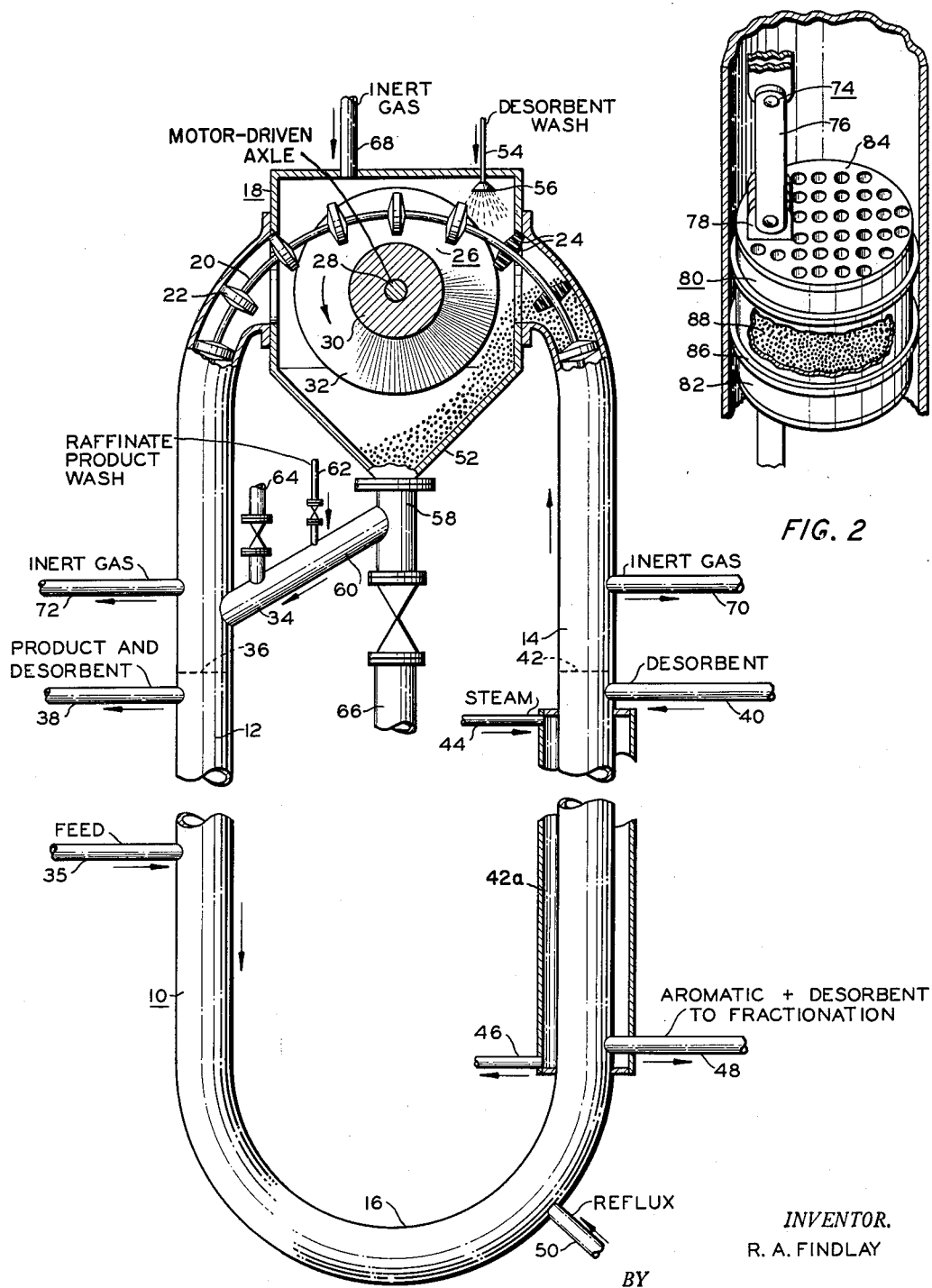

2,731,149
Patented Jan. 17, 1956

2,731,149

CONTINUOUS ADSORPTION-DESORPTION APPARATUS

Robert A. Findlay, Bartlesville, Okla., assignor to Phillips Petroleum Company, a corporation of Delaware Application January 4, 1950, Serial No. 136,773

2 Claims. (Cl. 210—42.5)

This invention relates to a method and apparatus for continuously separating organic mixtures into constituents by selective adsorption. In one of its specific aspects the invention has particular reference to the separation of hydrocarbon mixtures containing hydrocarbons of varying degrees of saturation by continuous adsorption treatment of same in the liquid phase. In another specific embodiment, the invention relates to the recovery of fractions of differing chemical characteristics and differing adsorbability by the use of continuously moving solid adsorbent particles. In certain embodiments the invention pertains to the separation of petroleum stocks into paraffinic and aromatic fractions.

It has long been known to contact a liquid mixture of organic materials with solid adsorbents, usually silica gel or activated charcoal, although many other adsorbents such as activated alumina, bauxite, magnesia, etc. can be used, whereby the more readily adsorbed component or components are taken up by the solid and the less readily adsorbed component or components remain unadsorbed. In this manner a separation can be obtained between components of a two component mixture, or a complex mixture can be separated into two fractions of different characteristics according to adsorbability. By repeated treatment, three or more fractions of different character can be separated. Several methods of recovering the adsorbed material from the solid are available, including the use of a different liquid for which the solid adsorbent has more affinity than the organic material which it has adsorbed, the use of a different liquid for which the solid adsorbent has less affinity than the organic material which it has adsorbed, and removal of the adsorbed material by vaporization from the adsorbent. Thus, a hydrocarbon mixture containing paraffins and aromatics can be contacted in the liquid phase with silica gel under conditions at which the paraffins are unadsorbed and the aromatic material is adsorbed. The paraffinic material is physically separated as one product from the gel, and the latter is then treated by one of the methods mentioned to remove the aromatic material which is thus recovered as the other product.

Lately, this basic process which has long been used by batch procedures has been developed into a continuous process, in which the silica gel or other solid adsorbent, in the form of powder or small granules, is passed downwardly in "rod-like" flow in the form of a compact bed or columnar mass in contact with the hydrocarbon or other liquid material which is being treated. The liquid feed is introduced at an intermediate or low point in the column of gel, and the unadsorbed so-called raffinate is withdrawn from the top. The adsorbed material or so-called extract is separated from the gel by a number of methods, either in the same column or in a separate column; however, when recovery of extract is effected in the same column, the adsorbent is then passed to a separate column where it is conditioned for reuse in the process. In order to obtain the desired degree of separation between fractions, a portion of the extract after its recovery from the gel as a product can be returned to the adsorption system as "reflux."

The potential advantages of such a continuous process are obvious, but many difficulties are encountered in attempting to convert the batch or semi-batch procedure formerly used to a truly continuous procedure. Sufficient and adequate contact between gel and the liquid being treated is sometimes difficult to accomplish. Clean-cut separations avoiding contaminations of either raffinate or extract with each other or with certain liquid desorbents are desired but not always obtained. Particularly when a liquid desorbent, which may or may not be immiscible with the liquid being treated, also has a lower specific gravity, it is difficult to avoid mixing of liquids or less of adsorptive capacity of the adsorbent by premature adsorption of such a desorbent liquid thereon. An additional difficulty arises from the fact that aromatic hydrocarbons, which are often the extract product, have a much greater density than non-aromatic hydrocarbons and certain desorbents, causing undesired downward migration into a desorption section of the column with consequent contaminations occurring. Furthermore, in all continuous processes heretofore developed, even when the desorption is effected in the same column of adsorbent as the adsorption by use of a more readily adsorbed liquid, the adsorbent particles of necessity are transferred to a second column for removal of the desorbent and reconditioning of the adsorbent prior to its return to the first column of the system for continuing the adsorption separation. Thus it has been necessary to employ two elevators for the particles of adsorbent with consequent undesirable losses of same by attrition.

It is an object of this invention to provide a continuous adsorption process for the fractionation of organic compounds.

It is another object of this invention to provide a continuous adsorption process for the separation of petroleum stocks into a plurality of fractions of differing characteristics.

A further object of the invention is to effect adsorption separation of liquids employing continuously moving adsorbent particles.

A still further object of the invention is to effect separation of an organic mixture into at least two fractions of differing characteristics in a single continuous adsorption treatment.

An additional object of the invention is to provide aromatic hydrocarbon reflux to a moving mass of adsorbent at a point in the path of flow of the adsorbent such as to avoid undesired migration of said reflux within the system.

An additional object of the invention is to effect the separation of a hydrocarbon mixture into saturated and unsaturated fractions by treatment of same in liquid phase with a continuously moving mass of solid adsorbent particles.

Further objects and advantages of the invention will be apparent, to one skilled in the art, from the accompanying disclosure and discussion.

In accordance with my invention in preferred embodiment a mass of particles of silica gel, activated charcoal or other solid adsorbent is continuously subjected to positive movement in the form of a large number of individual incremental portions of the adsorbent, through a long narrow confined path wherein the adsorbent comes in contact with various liquids including a liquid feed of organic materials to be separated into components, a reflux, and a liquid desorbent. The flow of liquids is so arranged that the liquid component of the feed having the highest specific gravity, and which ordinarily is obtained as the extract, is present in the lowermost portion of the long narrow confined path through which liquids and adsorbent are moved. My invention includes both the process and suitable apparatus for carrying out the process. A preferred apparatus is a modified form of what is commonly known as a flight conveyor, in which a large number of individual flights, having a disc form and in my invention being perforated sufficient to permit flow of liquid through the discs, are mounted on a cable or chain and positively driven through a tubular preferably cylindrical conduit. In one form of my invention the adsorbent particles are carried in loose agglomerations by such a conveyor through the desired path. In another modification of my invention, the particles of adsorbent are packed into a plurality of cells or cannisters having closed cylindrical sides and perforate ends and which take the place of the disc flights, being attached to a cable or chain at spaced intervals and positively driven through a tubular conduit in which the requisite contacting of liquid with solid adsorbent takes place.

My invention may be understood in more complete detail by reference to the accompanying drawing, wherein Figure 1 is a diagrammatic representation of one type of apparatus, shown partially cut away and partially in cross section, and flow of materials therethrough suitable for practicing the invention, and wherein Figure 2 is a partially cutaway view of a cannister construction forming a preferred modification of the invention. It will be appreciated by those skilled in the art that numerous mechanical details, as well as process variations, can be provided in addition to those shown in the drawing without departing from the invention.

In Figure 1, a long narrow cylindrical conduit 10 is provided, forming a closed circuit. As shown in the drawing, this takes the form of a vertically arranged loop, having a left and right leg 12 and 14 respectively, a bottom arc 16, and having included within its top portion a housing 18 containing the drive mechanism. Within the described structure is an endless cable 20 passing through the center of and being attached to a large number of flights or discs 22. These discs can be made of metal or other suitable material, and in any event they contain perforations 24 permitting flow of liquid therethrough but avoiding appreciable passage of particles therethrough. The outer edges of the flights are made of or bear a sealing ring made of rubber or other flexible material capable of maintaining a reasonably tight seal between the flights and the containing conduit 10. In the particular apparatus shown in Figure 1, the flights carried on a cable are driven in a counter-clockwise direction by a driving wheel 26 mounted on an axle 28 which is driven by a suitable motor or other mechanical drive not shown. The drive wheel 26 is made up of a hub 30 and two side pieces, only one of which, designated by the numeral 32, is shown on the drawing, and which together make up a pulley or sheave. The flights on the cable as they approach the sheave 26 are frictionally engaged thereby and this drives the entire flight conveyor. As the conveyor moves downward in leg 12, it picks up the adsorbent, e. g. silica gel, which is entering leg 12 from tube 34. The entering gel is picked by each flight in turn as it passes the point of entry, and carried along through leg 12, bottom 16, and leg 14 of the conveyor. The gel particles may range in size from 10 to 200 mesh, but preferably are not smaller than about 50 mesh.

Into an intermediate point of the leg 12, in which the gel is moved downwardly, is introduced via line 35 a feed liquid (by liquid I mean liquid at the conditions of treatment although the material may be normally solid or normally gaseous, as well as normally liquid) organic material composed of at least two components of differing adsorbability. The more readily adsorbed component is adsorbed and carried downwardly while the less readily adsorbed component passes upwardly in leg 12. A liquid level is maintained within the conveyor, the top of the liquid in leg 12 being indicated by interface 36. The less readily adsorbed component is withdrawn from a point near the interface 36 through a conduit 38, and comprises what is known as the raffinate product. For example, in the case of a feed made up of paraffinic and aromatic hydrocarbons, the raffinate is paraffinic in nature. The more readily adsorbed component is picked up by adsorption on the silica gel, and carried downward through leg 12, thence through the bottom portion 16 of the conveyor housing, and on upward in leg 14. Near the top of leg 14 is introduced a liquid desorbent from line 40. A liquid level, indicated by interface 42, is also maintained in this leg opposite the liquid level in leg 12. The desorbent is preferably a liquid which is less readily adsorbed than the portion of the feed which has been adsorbed by the moving gel and which it is desired to remove therefrom by desorption. In the case of a feed composed of cyclohexane and benzene, for example, the cyclohexane is obtained through line 38 as raffinate product while the benzene is adsorbed by the gel. A suitable less readily adsorbed desorbent liquid in this case is isooctane.

The liquid desorbent flows downwardly in leg 14 countercurrent to the moving gel and effects desorption of the more readily adsorbed component of the feed known as the extract product. Even though the desorbent is less readily adsorbed than the aromatic extract, desorption of the latter is possible in view of the fact that adsorption-desorption is an equilibrium operation and an adsorbed liquid, such as an aromatic hydrocarbon, can be desorbed by a paraffinic or cycloparaffinic (naphthenic) hydrocarbon liquid which is sufficiently low in its content of aromatic hydrocarbon. This desorption can also be aided by elevated temperatures, a range of 150 to 200° F. being quite suitable in most instances. Such an elevated temperature can be maintained in leg 14 by means of a jacket 42a heated by means of steam or other hot fluid introduced through line 44, the condensate or cooled heat exchange medium leaving jacket 42a via line 46. If necessary or desired a cooling jacket may be provided for the adsorption leg 12, which preferably operates at about room temperature, say 65–85° F. A liquid stream composed of desorbent and extract, in this case aromatic hydrocarbon, is withdrawn from a low point in the system, preferably near the bottom of leg 14, through line 48. This mixture is passed to suitable conventional fractional distillation means not shown for separation of extract from desorbent, the latter being returned to line 40 for reuse. In any event the desorbent is chosen so as to have a different boiling point from the various components of the feed in order to simplify separation of desorbent from products. The desorbent may be either higher boiling or lower boiling than the feed components from which it is separated.

In one type of operation, all of the desorbent introduced through line 40 is withdrawn through line 48 with the extract. After recovery of the extract product from the desorbent, a portion of the extract is returned to the adsorption system through line 50 as "reflux." This is returned preferably at a point slightly below the point at which conduit 48 withdraws the aromatic extract product plus desorbent. Reflux flows clockwise through the lower portion of the flight conveyor countercurrent to the gel, and provides a rectifying action by being preferentially adsorbed by the gel and thereby desorbing adsorbed raffinate material, as well as washing from the gel occluded raffinate material. The aromatic-rich extract material passing through the gel as reflux ultimately all becomes adsorbed by the gel in leg 12 and is brought back down and is recovered as product through line 48.

From the foregoing it will be seen that the lowermost portion 16 of the flight conveyor housing 10, i. e. the bottom of the U formed by leg 12, bottom 16, and leg 14, is maintained full of essentially pure extract material. This is an important advantage of my process and apparatus, in view of the fact that the aromatic hydrocarbons in the feed have by far the highest specific gravity of the various components of the feed. Inasmuch as the gel being lifted in leg 14 above the liquid level 42 is wet with liquid desorbent and remains so until it enters leg 12, the liquid desorbent present thereon being ultimately displaced and withdrawn with raffinate product through line 38, it is important that no aromatic hydrocarbon be permitted to contaminate the gel as it is withdrawn from its first point of contact with liquid desorbent at the point of entry of liquid desorbent through line 40. In accordance with my invention, there is no possibility of such contamination being caused by a settling of heavy aromatic liquid within the system. While the general direction of liquid flow is countercurrent to the gel flow, I have found in extensive experiments that when an aromatic-rich extract product is withdrawn from a downwardly moving column of gel at a point above the bottom of the column, considerable improvement in purity can be obtained simply by increasing the flow rate of both the liquid desorbent and the gel, while maintaining the ratio of these flow rates without change. It is believed that at least part of this phenomenon is caused by localized downward movement of aromatic hydrocarbons through the column of liquid and gel contrary to the general direction of the motion of the liquid. In accordance with the present invention, any such localized settling of aromatic hydrocarbons is limited to downward motion in leg 12, which is desired, and is avoided in leg 14 where passage of aromatic hydrocarbon toward the top of leg 14 where the gel is withdrawn from contact with liquid desorbent would be undesirable, as it would cause ultimate contamination of raffinate withdrawn through line 38 as described above.

The liquid withdrawn through line 38 is composed of raffinate product, e. g. paraffinic hydrocarbons, plus desorbent which has been carried over into leg 12 from leg 14 occluded on the gel, and this liquid is separated by fractional distillation by means not shown into raffinate product and desorbent, the latter being returned to line 40 for reuse.

As the flights 22 on cable 20 rise to the top of leg 14, the gel carried by these flights is dumped into the lower part 52 of housing 18. This dumping is assisted by a spray of liquid desorbent introduced from line 54 through spray head or jet 56. The liquid desorbent impinges on the flights 22 as they approach pulley 26 and washes therefrom any adhering gel. The conveyor flights then continue across drive pulley 26 essentially free from gel and this gel is again picked up in the upper part of leg 12 by the downwardly moving flights, as the dumped gel has been withdrawn from the bottom 52 of housing 18 through pipe 58 and is introduced through line 60 into leg 12. To assist the passage through line 60, an additional liquid washing stream is introduced through line 62. In the event the raffinate product is being recovered as kettle product in its separation from desorbent by fractional distillation, a portion thereof is used as washing liquid introduced through line 62. However, if the desorbent is the kettle product, it is used as the washing liquid introduced through line 62. In this way, this liquid wash does not undergo intermediate vaporization and condensation during the fraction distillation which would require additional expense. A valved conduit 64 is provided for introducing fresh make-up gel, and a valved conduit 66 is provided for withdrawing used gel from line 58 whenever desired. An inert gas can be introduced to the top of housing 18 through line 68 and withdrawn through line 70 and/or line 72. This inert gas, by passage through the conveyor flights, particularly in the upper part of leg 14, can reduce the amount of liquid desorbent carried over on the gel.

As an alternative method of operation with a less readily adsorbed desorbent, only a portion of the desorbent liquid introduced through line 40 is withdrawn with extract through line 48. The remaining portion is allowed to pass onward through the bottom 16 and the left leg 12 of the conveyor for ultimate withdrawal with raffinate through line 38. When this is done, the less readily adsorbed desorbent passing through the gel carries in it sufficient aromatic extract material to provide an internal reflux, thus minimizing or eliminating the need for additional reflux introduced through line 50. The general principles of this type of desorption in a system employing a continuously moving adsorbent are described in detail in copending application Serial No. 135,104, filed December 27, 1949, of which I am co-inventor, and to which reference is hereby made.

As a further alternative method of operation, a more readily adsorbed desorbent, for example a polar compound such as methyl alcohol, ethyl alcohol, water, etc., the nature of this type of desorbent being well known to those skilled in the art, is employed. In this instance, all the desorbent introduced through line 40 is withdrawn through line 48 with the aromatic product, except for that which is carried upward by the gel being withdrawn from the liquid in leg 14. It is necessary to subject this gel, prior to reuse in leg 12, to a steaming or other high temperature treatment for complete removal of the adsorbed alcohol or other polar compound used as desorbent. This can be done by providing an additional zone in the upper part of my apparatus through which steam or other high temperature gas is passed for driving off the desorbent prior to reuse of the gel.

Although one specific type of drive mechanism is shown in the drawing, various other means of driving the conveyor flights mounted on the cable can be provided by those skilled in the art, having been given the present disclosure. Furthermore, although the conveyor flights are shown in Figure 1 as discs 22 mounted on a center cable 20, they may take other suitable forms, for example, discs mounted at one edge on a chain which travels near one side of the housing and with which sprockets of a driving gear engage for driving the conveyor flights in known manner; in such instance the pins joining the drive links and the links to which the conveyor flights are attached are preferably sealed in abrasion-resistant rubber to avoid contact of the solid particles of adsorbent therewith.

Figure 2 shows a preferred embodiment of the invention, wherein a chain 74 is used, made up of alternating driving links 76 and other links 78, a cannister 80 being attached to each of the latter. The cannister is made up of an imperforate cylindrical shell 82 and perforate ends 84. Synthetic rubber or other flexible sealing gaskets or rings 86 are provided for preventing flow of liquid around the cannister and causing the liquid to flow through the cannister. Each cannister is packed full of solid particles of adsorbent 88, e. g. silica gel. In this embodiment of the invention, no dumping means for the gel such as provided in conjunction with Figure 1 is necessary and attrition of the gel particles is held at a complete minimum.

In view of the fact that the basic physical principles underlying adsorption are now well known to the art, a detailed consideraton of same will not be given here. Those skilled in the art will readily understand that the exact conditions to be employed, including temperatures and relative flow rates of adsorbent, feed, and desorbent, etc., will be greatly dependent on the particular feed stream which it is desired to separate, the degree of separation chosen, and the characteristics of the particular adsorbent used. Similarly, the residence time and temperature required for satisfactory desorption are dependent on the adsorbent, the character of the extract, and the character of the desorption operation.

The process described may be applied to a wide variety of feed stocks. Thus wide boiling range gasolines may be treated to effect separation of hydrocarbons merely by type rather than by individual chemical components, virgin or cracked gas oils may be treated to separate same into a highly aromatic extract of low aniline point suitable for feed in making furnace type carbon black such as "Philblack" and a highly paraffinic raffinate of high aniline point suitable for catalytic cracking or use as a diesel fuel, kerosene or other naphtha fractions may be treated to remove aromatics and sulfur compounds therefrom. Narrow boiling aromatic-paraffinic or olefinic-paraffinic cuts may be fractionated by adsorption to produce pure aromatic, paraffinic and olefinic compounds. It will be noted that this adsorption fractionation process is adapted to any desired degree of separation. Thus it may be used to produce one or more relatively pure compounds or it may be used merely to concentrate further a desired compound in its original mixture.

One particular separation to which my invention is applicable is the removal and recovery of aromatic hydrocarbons such as benzene and toluene from a dilute mixture of same in refinery streams. In another operation, a cracked gas oil containing a considerable proportion of aromatic hydrocarbons in addition to paraffinic and olefinic hydrocarbons and which may or may not contain some naphthenic hydrocarbons is treated to provide a low aniline point extract oil and a high aniline point raffinate oil of greatly decreased sulfur content. For example, a 150° F. aniline point gas oil can be treated to produce a 50° F. aniline point gas oil for use in producing furnace carbon black. Heated kerosene essentially free of aromatic constituents is used as a desorbent and is passed through the system at the same rate as the gas oil feed. Silica gel of 14 to 20 mesh size is circulated in the apparatus of Figure 1 at a rate of 7 pounds per gallon of gas oil feed. In this instance a portion of the kerosene desorbent is permitted to pass entirely through the adsorption section, providing internal reflux therein and being withdrawn along with the raffinate product. The kerosene desorbent also serves to reduce the viscosity of the gas oil feed and thus improves the separation. Another suitable desorbent for this and other separations include cyclopentane, normal pentane, hexane, and isooctane, as well as other saturated hydrocarbons. In passing through the moving silica gel, all or the major portion of the aromatic content of the feed is adsorbed, the percentage adsorbed depending on the ratio of gel flow rate to aromatic flow rate. The percentage adsorbed also depends on the temperature of treatment, character of the various feed constituents, character of desorbent, concentration of desorbent present, quantity of gel contacted by given quantities of liquids, and various other factors as will be appreciated by one skilled in the art by virtue of the present disclosure.

In addition to the advantages set forth hereinabove and others which will be apparent to those skilled in the art on reading the present disclosure, it may be pointed out that my invention permits subjecting the adsorbent both to contact with liquid reflux and also to contact with liquid desorbent. Thus, the advantages of a positive reflux are obtained, together with the advantages of liquid phase desorption which minimizes or avoids altogether the subjecting of adsorbent to drying at high temperature. It has been found more preferable to effect desorption in the liquid phase rather than to remove the extract from the adsorbent by vaporization, as this latter procedure calls for a more extended heat treatment and higher temperatures, such as 300–400° F., or more, with resulting deleterious effect on the gel, apparently the gel structure itself being affected and the gel also becoming clogged by polymerization or other degradative reactions of adsorbed hydrocarbons. This is avoided in my process by keeping the gel wet at all times.

Numerous non-hydrocarbons and particularly non-hydrocarbon organic liquid mixtures may be subjected to adsorption to separate same into group or individual constituents. The separation or fractionation of normally solid or normally gaseous organic compounds as well as the employment of normally solid or normally gaseous organic compounds as desorbing agents, especially those readily liquefied, are within the scope of this invention since they may be changed to liquids by appropriate coordination of two normal process variables, namely, temperature and pressure. For example, this process is readily adaptable to the fractionation of a normally gaseous butene-butadiene liquid mixture by slightly increasing operating pressures, with or without using decreased temperatures. Similarly it is within the scope of this process to purify a normally solid naphthalene stock by conducting the liquid adsorption-fractionation at a moderately elevated temperature. With respect to hydrocarbon types in general, polynuclear aromatics are most readily adsorbed, mononuclear aromatics next, and continuing in accordance with decreasing adsorbability are the cyclic olefins, open-chain olefins, naphthenes, and paraffins. Ketones are more readily adsorbed than hydrocarbons, alcohols more than ketones, and water more than alcohols. The relative adsorbabilities of other liquids are already known to the art, or may be readily determined by trial. While certain specific materials have been described herein as the desorption liquid, various other liquids capable of effecting this are known to the art and may be used as determined by convenience or economics, taking into consideration effectiveness for desorbing a particular extract, cost, effect on adsorbent, and ease of removal from adsorbent.

While specific and preferred embodiments of the invention have been described herein, it will be appreciated that other variations may be made in the apparatus and process without departing from the spirit and scope of the invention.

I claim:

1. Apparatus for separating a mixture of organic liquids into fractions which comprises, in combination, a conduit having the general configuration of a vertical endless loop, the upper portion of the loop being shaped to define an enlarged housing, an endless flexible conveyor traversing the entire length of said conduit and extending through the housing portion thereof, means operatively connected to said conveyor to effect continuous movement thereof, said conveyor including a plurality of perforated disks spaced longitudinally therealong to transport particles of absorbent material through said conduit, whereby said particles are carried downwardly through one leg of the loop, traverse the bottom of the loop, thereafter are carried upwardly through the other leg of the loop and dumped into said housing, a spray head positioned within said housing so as to wash the absorbent material from said disks into the lower portion of the housing, a pipe depending from the lower part of said housing and communicating therewith for withdrawing adsorption material from the system, a pipe having one end thereof communicating with said last mentioned pipe and the other end thereof communicating with the central region of said one leg of the conduit, a jacket surrounding a substantial portion of the lower region of said other leg of the loop, means for introducing a heating fluid into said jacket and removing said heating fluid therefrom so as to heat the enclosed portion of the conduit, a line for introducnig liquid desorbent material into said other leg above said jacket, a line for withdrawing liquid from the jacketed portion of said conduit, a line for introducing liquid into said one leg, and a line for withdrawing liquid from said one leg at a position above said liquid introduction line.

2. Apparatus for separating a mixture of organic liquids into fractions which comprises, in combination, a conduit having the general configuration of a vertical endless loop, the upper portion of the loop being shaped to define an enlarged housing, an endless flexible conveyor traversing the entire length of said conduit and extending through the housing portion thereof, means operatively connected to said conveyor to effect continuous movement thereof, said conveyor including a plurality of baskets spaced longitudinally therealong, each basket including a cylindrical casing closely spaced to the walls of said conduit, a plurality of sealing rings mounted exteriorly of said casing and contacting the inner walls of said conduit, a pair of plates secured to and closing the respective ends of said casing, each plate having a series of openings extending therethrough, each of said baskets being adapted to carry a mass of adsorbent material, whereby said particles are carried by the baskets downwardly through one leg of the loop, traverse the bottom of the loop and thereafter are carried upwardly through the other leg of the loop, a jacket surrounding a substantial portion of the lower region of said other leg of the loop, means for introducing a heating fluid into said jacket and removing said heating fluid therefrom so as to heat the enclosed portion of the conduit, a pipe for introducing desorbent liquid into said other leg above said jacket, a pipe for withdrawing liquid from the jacketed portion of said conduit, a pipe for introducing liquid feed into said one leg, and a pipe for withdrawing liquid product and desorbent from said one leg at a position above said feed introduction pipe.

References Cited in the file of this patent

UNITED STATES PATENTS

| | | |
|---|---|---|
| 2,111,788 | Krchma | Mar. 22, 1938 |
| 2,273,557 | Bonnotto | Feb. 17, 1942 |
| 2,317,379 | Hemminger | Apr. 27, 1943 |
| 2,327,438 | Kuhn | Aug. 24, 1943 |
| 2,378,281 | Browne | June 12, 1945 |
| 2,443,412 | Bergstrom et al. | June 15, 1948 |
| 2,449,402 | Lipkin et al. | Sept. 14, 1948 |
| 2,464,311 | Hiatt et al. | Mar. 15, 1949 |
| 2,470,339 | Claussen et al. | May 17, 1949 |
| 2,542,521 | Hibshman et al. | Feb. 20, 1951 |
| 2,575,551 | Frechin | Nov. 20, 1951 |
| 2,585,490 | Olsen | Feb. 12, 1952 |
| 2,614,133 | Ockert | Oct. 14, 1952 |
| 2,603,667 | Pankratz et al. | July 15, 1952 |